(No Model.)  2 Sheets—Sheet 1.

O. H. & I. H. JEWELL.
FILTER.

No. 509,126.  Patented Nov. 21, 1893.

Witnesses:

Inventors
Omar H Jewell
Ira H Jewell
By Wm Johnson
Atty.

(No Model.) 2 Sheets—Sheet 2.

O. H. & I. H. JEWELL.
FILTER.

No. 509,126. Patented Nov. 21, 1893.

Witnesses:
Wm. M. Rheem.
Wm. F. Hemming

Inventor:
Omar H Jewell
Ira H Jewell
By Wm Johnson Atty.

UNITED STATES PATENT OFFICE.

OMAR H. JEWELL AND IRA H. JEWELL, OF CHICAGO, ILLINOIS.

FILTER.

SPECIFICATION forming part of Letters Patent No. 509,126, dated November 21, 1893.

Application filed January 31, 1893. Serial No. 460,412. (No model.)

*To all whom it may concern:*

Be it known that we, OMAR H. JEWELL and IRA H. JEWELL, citizens of the United States, residing at Chicago, in the county of Cook and State of Illinois, have invented certain new and useful Improvements in Filters; and we do hereby declare the following to be a full, clear, and exact description of the invention, such as will enable others skilled in the art to which it appertains to make and use the same.

Our invention relates to improvements in filters, of the class known as "gravity filters," adapted for the filtration of water upon a large scale, and which are provided with a power driven agitator for stirring up the filter bed or materials, during the process of washing said materials from the accumulated impurities.

The object of the invention is to increase the efficiency of the filter by lengthening the time in which the filtering materials may be properly used without washing, depending upon the degree or quantity of impurities contained in the water, and by diminishing or reducing to a minimum the time required or consumed in the operation of washing said filter materials.

The invention is in part in the nature of an improvement upon that granted to Omar H. Jewell and William M. Jewell, in Letters Patent No. 425,573, dated April 15, 1890, and in further part of that shown in an application filed by the said Jewell and Jewell, June 7, 1892, Serial No. 435,883.

The invention consists briefly, in providing the main water tank with an inner tank adapted to hold the filtering material, the outside diameter of the inner tank being smaller than the inside diameter of the main tank and set concentric therewith, forming an annular water space or channel between said tanks, adapted for a sediment or settling chamber, and to receive the impurities when washed from the filter bed, and from which said sediment, and impurities may be readily drawn off.

The invention further consists in an improved stirring or agitating arrangement for washing and cleansing the filter bed material, and in the novel combination, construction and arrangement of parts, and which are hereinafter fully described and set forth, reference being had to the accompanying drawings, in which—

Figure 1:
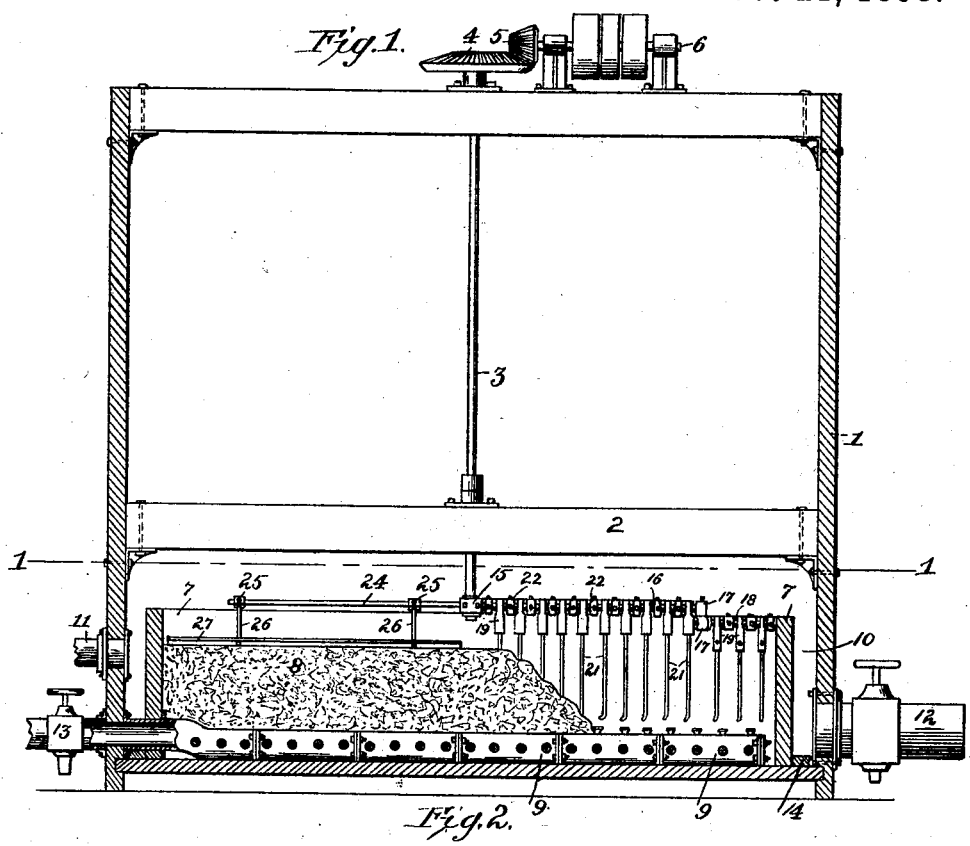
Figure 2:
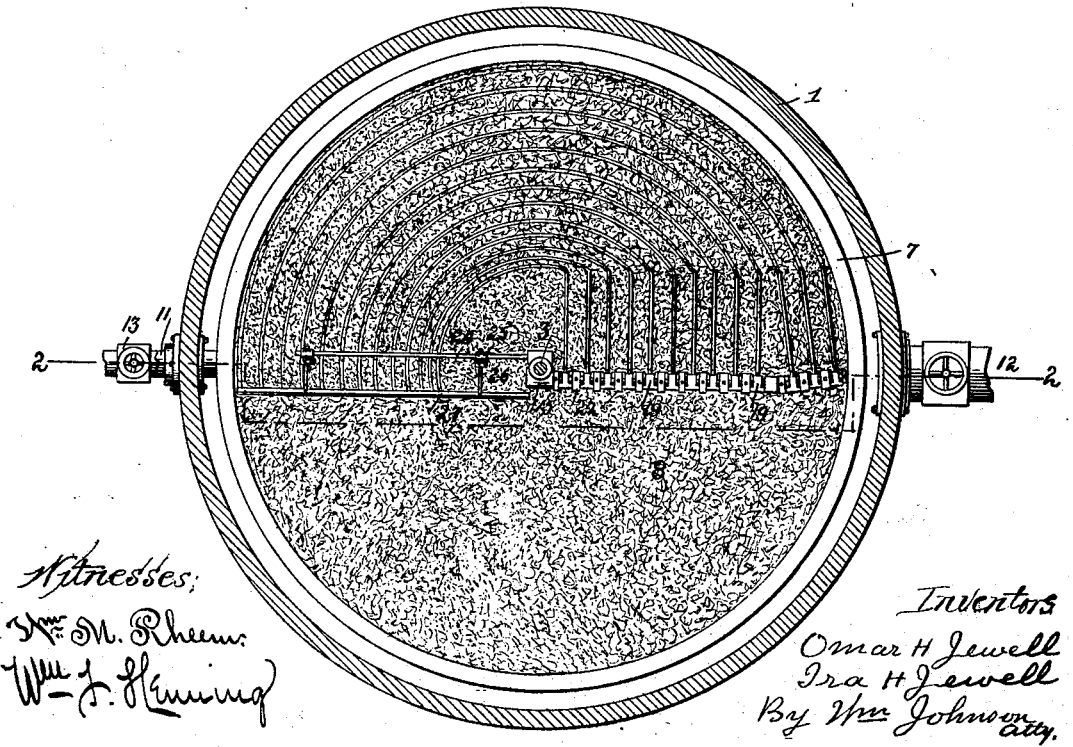
Figure 3:
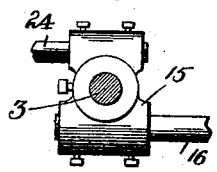
Figure 4:
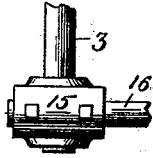
Figure 5:
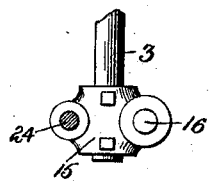
Figure 6:
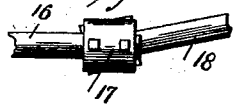
Figure 7:
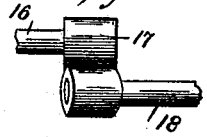
Figure 8:
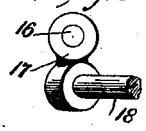
Figure 9:
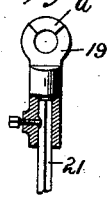
Figures 10, 11, 12, 13:
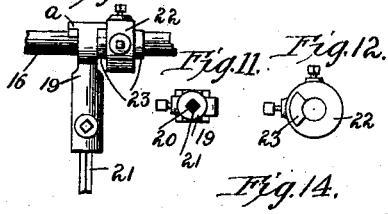
Figure 14:
Figures 15, 16:
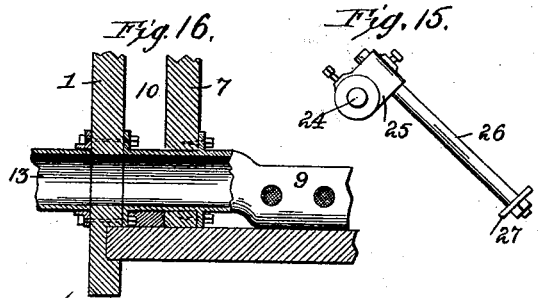

Figure 1 is a vertical section of my improved filter taken on the line 2. 2. of Fig. 2. Fig. 2 is a transverse section taken on the line 1. 1. of Fig. 1. Figs. 3, 4, and 5 are detail views of the driving head attached to the lower end of the agitator shaft. Figs. 6, 7, and 8 are detail views of the angle casting adapted to connect the two parts of the lateral or horizontal finger bar arm or shaft. Figs. 9, 10 and 11 are detail views of the finger bar socket or clutch casting adapted to be fitted to the horizontal arm or shaft, and for attachment to the finger bars. Figs. 12 and 13 are detail views of the clutch set collar, interposed between said finger bar sockets or clutch castings. Fig. 14 is an elevation of the finger bar and pivoted socket casting shown in a horizontal position by dotted lines. Fig. 15 is an end view of the leveling, or wiping bar and showing its attachment to the lateral arm of the driving shaft. Fig. 16 is a detached view, showing the manner of connecting the filtered water-pipe with the tanks.

In the drawings, 1 designates the water receiving tank which as shown is of the ordinary cylindrical type, formed of wood secured by metal hoops or bands in the usual manner. Said tank is provided with cross beams 2, solidly attached to the inside thereof, and adapted for the support of the boxes or bearings of the upright agitator shaft 3. Said shaft is adapted to be revolved within said tank by means of the bevel wheel 4, rigidly attached to its upper end and the pinion wheel 5, upon the end of the counter shaft 6, upon which is mounted the usual reversing arrangement of a narrow fixed pulley and two wide loose pulleys, upon which are run an open and a cross-belt, and which are adapted to be shifted upon said pulleys for the purpose of stopping or changing the direction of motion.

7 is the inner tank set concentric within the main tank, and is adapted to hold the materials 8, through which the water is filtered, and at the bottom of which is the pipe 9, provided with reticulated openings through which the filtered water passes and is conveyed to be used. The diameter of said inner tank is such as to leave an annular space 10, between the inner and outer tanks, of sufficient capacity to admit the incoming unfiltered water through inlet valve 11, into said space, and to form a sediment chamber, in which a portion of the heavier particles will settle with the admission of the water, and to which the impurities deposited in the filter bed or material, in the process of filtration will flow, and which will be carried off through the outlet valve opening 12, when the water is reversed, and in the operation of cleansing and washing the filter bed or material.

The construction by which the filtered water pipe is carried through the side of the inner tank, and across the annular space between the tanks, will be clearly seen in the detached view Fig. 16. Said pipe is made in sections. One of the end sections is provided with two flanges cast thereon, the outer one of which is adapted to be bolted to the inside of the main tank, and the other one to the inside of the inner tank, and the valve 13, connecting with the consumer's pipe is bolted against the outside of the main tank, the bolts passing through the flange upon the inside.

In the construction of the tanks, the main tank is first set up complete and segments of plank 14, are attached to the bottom and against the inside of said tank. The bottom end of the staves to form the inside tank are then secured to the inside of said segments and the top end of said staves are held by a hoop or band.

15 is a driving head, which is rigidly attached to the lower end of the upright agitator shaft, the form of which is shown in detail, views 3, 4 and 5 and which consists of cylindrical projections formed upon either side, and horizontally across the body portion of said driving head, through which the agitator shaft passes. One of said projections is adapted to receive, and to carry with it, the laterally projecting arm or shaft 16. Said arm extends to within a short distance of the inside of the inner tank, and has solidly attached to its outer end the angle casting 17, shown in views 6, 7, and 8, to which a short lateral arm extension 18, is also rigidly attached, the center line of which, intersects that of the longer portion at an obtuse angle laterally thereto, but in a horizontal plane below said longer arm and extending out therefrom to just clear the inside of said inner tank.

19 is a socket casting shown in detail, views 9, 10 and 11. Said socket casting is perforated or bored to fit and turn freely upon the described lateral arms 16, and 18, and is provided upon both sides at the upper end with clutch coupling projections $a$, and with a longitudinal square perforation 20, at the lower or shank end, adapted for the insertion of the square finger bar 21, to which it is attached by means of a set screw.

22 is a set collar adapted to be fitted to said lateral arms, and is provided with clutch projections 23, upon its sides which are adapted to engage with the like clutch projections upon the finger bar socket casting. A series of said socket castings and set collars are mounted upon the said lateral arms, the socket casting being interposed between two set collars, the said clutch projections engaging with or abutting one against the other to hold the finger bars in a vertical position, when being carried around by the revolution of the agitator shaft in the direction to loosen up the filter bed during the washing process, and which are out of contact when the motion is reversed and the finger bars are carried or turned to an angle approaching the horizontal position, shown by dotted lines in Fig. 14, and adapted to operate upon the top of the filter bed.

24 is a lateral arm or shaft, rigidly attached to the driving head upon the agitator shaft, and is upon the opposite side of the center of said shaft, and extends in an opposite direction therefrom to that of the lateral arm carrying the finger bars. Said lateral arm is provided with two castings 25, movably attached thereto by means of set screws, and are perforated upon one side of said lateral arm for the insertion of the arms or shafts 26, the upper ends of which are adjustably secured therein by means of set screws. Attached to the lower ends of said arms is a leveling or wiping bar 27, adapted to be adjusted to the normal height of the filter bed by means of the arms, and said castings by which it is carried around, the construction being clearly shown in Fig. 15.

In our former patent to which reference has been made, we have shown an interior endless V shaped trough located at top of the filter bed. The arrangement is defective both in form and location as the V shape is not favorable for the removal of the sediment, and the impurities will settle at the lowest point. In our present invention these defects are remedied, the practical results showing a much greater efficiency in the collection and removal of the impurities. It is obvious that in the admission of the water into the annular space between the tanks, that a portion of the impurities will be carried against the inner tank, and will gradually settle to the bottom without coming in contact with the filter bed, and that the heavier particles suspended in the water, overhanging the annular space, will gravitate to the bottom of said annular space, and it is equally obvious that the reverse wash water will most naturally overflow at the top of the inner tank, carrying the impurities with it to the bottom of the annular space, the theoretical arrangement being fully justified by practical experience. It will be observed also, that the agitator possesses features of construction and arrangement of parts, which adapt it to the requirements in a high degree, some of which have been in part described in a former application hereinbefore referred to, consisting chiefly of the clutch finger bar socket castings and clutch set collars. In said application the lateral arm supporting said castings extended radially outward from the center of the upright shaft, making it impossible to suspend the finger bars at, or near the outer end of said lateral arm, as they would strike the side of the tank when the motion was reversed, leaving a large space near the periphery of the filter bed, not acted upon by the finger bars during the process of filtration. This is obviated in our present invention, by setting the outer portion of the lateral arm at an angle, so that when the finger bars are dragging upon the top of the filter bed, the point of suspension, and the end of the finger bars will be at the same distance from the inner periphery of the tank. It will be observed also that the form of construction, shown in the attachment of the lateral arms to the driving head, and of the bars supporting the leveling or wiping bar, has a special adaptation, as the parts will corrode and rust fast, and when the shafts, or arms are inserted radially from the center, instead of across the outside of the shaft, they are much more difficult to adjust or to take apart for repairs, and also that when the lateral finger bar arm, is held to one side of the center of the upright agitator shaft as herein shown, the ends of the finger bars will be brought near the center of the filter bed when acting upon the top of said bed. It will be noticed that we form some of the finger bars with a lateral extension, which increases in length as the bars approach to the center of the tank, and that we also tip or turn the ends of said extension downward; this is for the purpose of acting upon a greater portion of the filter bed surface than would be possible with all straight bars.

In the several views given, we have omitted showing the full arrangement of pipes and valves necessary for reversing the water, it being understood that all the parts not shown are of the ordinary construction for filters of this class, and which have been fully shown and described in our former patents.

The practical operation of this class of filters is well known and requires no description, it only being necessary to call attention to the fact that the agitator shaft is kept in motion during the process of filtration, and that the finger bars are acting upon the top of the bed, cutting it up into furrows, which are constantly being leveled down by the leveling or wiping bars as shown in Fig. 2, and thus preventing the vicious impurities from settling upon the surface of the filter bed and keeping it in a live and working condition; also that the finger bars assume the desired position automatically, being self-adjusting upon the reversal of the motion of the shaft, and which is a valuable feature of our invention.

We are aware that to stir up the filter bed by revolving fixed or stationary finger bars therein during the washing process, and to reverse the motion thereof, is not broadly new, and we do not therefore claim such as our invention, and, with respect to the finger bars, we are also aware that to pivot a bar and to limit the motion of said bar upon said pivot is not *per se* new.

In our invention the finger bars are self-adjusting to the direction of motion, and consist of two series, movable in different planes and for a new and useful purpose.

Having fully described our invention, we claim—

1. In a filter comprising a water tank and a filtering material tank set centrally within and upon the bottom of said water tank, the annular space between said tanks adapted to form a sediment or settling chamber, the combination therewith of an upright agitator shaft centrally supported in said tank or tanks and adapted to be turned or revolved in either direction, said upright shaft provided with a lateral arm rigidly attached thereto, the outer end portion of which is formed at an angle to the inner portion, and said lateral arm provided with finger bars pivotally attached thereto, substantially as and for the purpose specified.

2. In an agitator for a filter of the kind described the combination of the upright shaft 3, centrally supported therein and adapted to be turned or revolved in both directions the driving head 15, rigidly attached to said upright shaft, said driving head provided with transverse perforations, one upon either side of the center of said upright shaft, said perforations adapted for the insertion of lateral arms, one of which is provided with finger bars, adapted for stirring up the filtering material, and the other of which is provided with a wiping bar, adapted for leveling the top of said filtering material, substantially as specified.

3. The combination of the water tank 1, the filter bed tank 7 set concentric within said water tank, the agitator shaft 3 centrally journaled to cross beams in said water tank, the driving head 15 rigidly attached to the end of said shaft, the lateral arm 16 rigidly attached to said driving head, the angle casting 17 rigidly attached to the outer end of said lateral arm, the short lateral arm 18 rigidly attached to said angle casting, the finger bar socket casting 19 provided with the clutch projections *a* upon its side and with the finger bar perforation 20 and adapted to be fitted to said lateral arm to turn freely thereon or to be pivotally attached thereto, the set collar 22 provided with like clutch projections 23 and adapted to be secured to said lateral arms by set screws, and the finger bars 21 adapted for insertion into the perforation in the said socket casting, said socket castings and set collars mounted seriately and alternately upon said lateral arms, substantially as and for the purpose specified.

4. In a filter the combination of the water tank 1, provided with the filter bed tank 7 set concentric therein and the cross beams 2 solidly attached therein, the agitator shaft 3 journaled to said beams, the driving head 15 rigidly attached to said shaft, the lateral arm 16 rigidly attached to said driving head, the angle casting 17 rigidly attached to the outer end of said lateral arm, the extension lateral arm 18 rigidly attached to said angle casting the finger bar socket and clutch casting 19, the clutch set collar 22, the finger bar 21 rigidly attached to said socket casting, a series of said socket castings and set collars mounted and arranged upon said lateral arms and adapted to be carried around therewith, and the leveler or wiper bar 27 adapted to be carried around upon the top of the filter bed 8 by means of the lateral arm 24, and to be adjustably attached to said lateral arm by means of the castings 25 and arms 27, substantially as and for the purpose specified.

5. In a filter the combination of an agitator shaft adapted to be revolved in both directions, a driving head upon said shaft carrying lateral arms extending in opposite directions from the center of the said shaft, one of said lateral arms provided with self-adjusting finger bars pivotally attached thereto and adapted to be held or supported in a vertical position for agitating and stirring up the filter bed, or to be carried in a reverse direction upon the top of said filter bed, and a leveling or wiping bar adapted to operate upon the top of said filter bed, substantially as and for the purpose specified.

6. In an agitator for a filter, the combination of a finger bar, pivotally mounted or attached to a carrying arm upon the agitator shaft, and provided with clutch projections or stops which abut against like clutch projections upon a collar rigidly secured to said carrying arm, when it is carried around in one direction, adapted for stirring and loosening up the filter material, and which are out of contact when the motion is reversed, and the finger bar is then free to turn upon the carrying arm until the ends of the finger bar rest upon, and are dragged over the top of the filter bed, substantially as and for the purpose specified.

7. In a filter the combination comprising the water tank 1, provided with inlet and outlet openings 11 and 12, and with cross beams 2, the inner tank 7 set concentric within said water tank, and adapted to contain the filter bed material 8, the annular space 10 between said tanks, adapted for a sediment and settling chamber, the pure or filtered water pipe 9, provided with reticulated openings, one end of which extends across said annular space and is bolted to the inside of both of said tanks, the upright agitator shaft 3 journaled in bearings supported by said cross beams, and adapted to be turned or revolved in either direction by means of the beveled toothed wheel 4 attached to its upper end, and the bevel pinion wheel 5 upon the counter shaft 6, and the pulleys mounted upon said counter shaft, the driving head 15, rigidly attached to the lower end of said agitator shaft, the lateral arm 16, the angle casting 17 attached to the outer end of said lateral arm, the extension lateral arm 18, rigidly attached to said angle casting, the finger bar socket casting 19, provided with the clutch, or stop projections $a$ mounted upon said lateral arm, the set collar 22 provided with clutch projections 23 adapted to engage with the projections upon said finger bar socket castings, the finger bars 21 provided with the lateral bent ends, and adapted to be secured to said socket castings, the lateral arm 24 rigidly attached to said driving head the castings 25 movably attached to said lateral arms, the arms 26 adjustably attached to said lateral arm castings and the leveling or wiping bar 27 attached to said adjustable arms combined and arranged in the manner substantially as and for the purpose specified.

In testimony whereof we affix our signatures in presence of two witnesses.

OMAR H. JEWELL.
IRA H. JEWELL.

Witnesses:
J. CHARLES MOORE,
EARLE F. HORTON.